United States Patent Office 3,499,726
Patented Mar. 10, 1970

3,499,726
MANUFACTURE OF CALCIUM CYANAMIDE
Kurt Scheinost, Tacherting, Germany, assignor to Suddeutsche Kalkstickstoff - Werke Aktiengesellschaft, Trostberg, Germany
No Drawing. Filed Feb. 15, 1968, Ser. No. 705,620
Claims priority, application Germany, Feb. 17, 1967, S 108,380; Jan. 12, 1968, S 113,704
Int. Cl. C01c 3/18
U.S. Cl. 23—78
12 Claims

ABSTRACT OF THE DISCLOSURE

Calcium cyanamide is prepared from calcium oxide and urea at temperatures above 400° C. in the presence of a substance, such as carbon monoxide, which reacts with the water formed in the reaction.

---

This invention relates to the preparation of calcium cyanamide by heating calcium oxide or compositions containing calcium oxide and urea or its decomposition products.

The term "compositions containing calcium oxide," as used herein, comprises mixtures of calcium oxide with other compounds, which may or may not contain calcium, as well as such calcium compounds, which by themselves or in mixture with other compounds, which under the conditions of the reaction form calcium oxide or react like calcium oxide; such compounds are particularly calcium hydroxide, calcium carbonate, and dolomite. For instance, the hydrated lime obtained in the generation of acetylene from calcium carbide can be employed after its dehydration by calcination. If such hydrated lime is obtained in the dry acetylene generation, it can be directly used as starting material when ground to a suitable powder. All these materials will be called the "calcium component."

The term "thermal decomposition products" or urea comprises all gaseous, liquid, or solid substances formed when urea is heated, and all mixtures of such substances. Examples are biuret, triuret, and higher linear condensation products; cyanic acid or mixtures of cyanic acid and ammonia, as well as ammonium cyanate; cyanuric acid; ammelide, ammeline; melamine and its thermic deamination products such as melam, melem, and others. All these materials will be called "urea component."

Various methods for the preparation of calcium cyanamide from calcium oxide and urea have been described.

Patent No. 1,842,018, e.g., discloses a process for the preparation of nitrogen (e.g. calcium cyanamide) containing products by heating calcium oxide and/or calcium carbonate and urea or its thermic decomposition products at temperatures of 70 to 900° C. Obnoxious gaseous reaction products such as carbon dioxide and water, are removed from the reaction space by scavenging with oxygen-free gases or gases which do not form oxygen at the reaction temperature, such as nitrogen or ammonia.

According to German Patent No. 577,340, calcium cyanamide is obtained by heating first calcium oxide and urea at 140 to 300 C. until calcium cyanate is formed; said calcium cyanate is then converted in a second step at temperatures in excess of 400° C. to calcium cyanamide. Also there it is stated to be of advantage to pass oxygen-free gases such as nitrogen or ammonia above or through the reaction mixture to remove the water formed in the reaction (according to Equation 2).

Finally, it is known to prepare calcium cyanamide by heating urea with a mixture of calcium oxide and calcium chloride at temperatures of 540 to 1090° C., whereby the calcium chloride content of the CaO/CaCl$_2$ mixture should be 10 to 52.5 percent.

All the known methods have the common drawback that they produce relatively low nitrogen yields as calcium cyanamide calculated on the urea component. This applies also to the methods operating with an inert purging gas. This is the reason why none of the known processes has been carried out on a commercial scale.

The reaction of calcium oxide with urea to calcium cyanamide presumably proceeds according to the following equations:

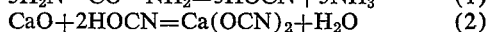
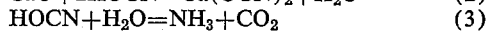
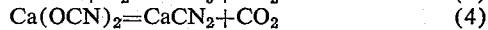

$$3H_2N-CO-NH_2 = 3HOCN + 3NH_3 \quad (1)$$
$$CaO + 2HOCN = Ca(OCN)_2 + H_2O \quad (2)$$
$$HOCN + H_2O = NH_3 + CO_2 \quad (3)$$
$$Ca(OCN)_2 = CaCN_2 + CO_2 \quad (4)$$

These gives the summary reaction:

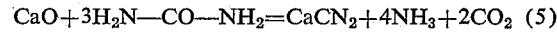

$$CaO + 3H_2N-CO-NH_2 = CaCN_2 + 4NH_3 + 2CO_2 \quad (5)$$

The Equations 1–5 are given for a better understanding of the reaction but should not be understood to constitute a correct illustration of the actual reaction.

The water of reaction formed according to Equation 2 hydrolyzes Equation 3 cyanuric acid; this means that 3 moles of cyanuric acid or urea are required to form 1 mole of calcium cyanamide so that theoretically only a third of the employed urea nitrogen is eventually converted to cyanamide nitrogen Equation 5.

Some of the known methods referred to above for the preparation of calcium cyanamide from calcium oxide and urea make an attempt to eliminate the formed water of reaction by means of an inert purging gas from the reaction mixture and thus to render it harmless. However, this does not succeed, or only to a limited extent because the hydrolysis proceeds faster than the removal of the water vapor is possible. Therefore, I could not reproduce the nitrogen yield of 45%, which can be calculated from the German Patent No. 577,340 though repeated attempts were made. This is confirmed by Patent No. 3,173,755, which requires 3 moles of urea per mole of calcium oxide to prepare one mole of calcium cyanamide. The use of large amounts of purging gas, which could improve the desired effects, is limited because cyanuric acid has a quite considerable vapor pressure over heated urea and would be, therefore, entrained unreacted from the reaction mixture and be lost for the reaction.

The same conditions apply when, instead of urea, its thermal decomposition products are used as starting material. The reaction with the calcium component will always produce water; at the reaction temperatures, all the thermal decomposition products, either of themselves or in form of the scission products produced under the action of the heat, are sensitive to hydrolysis. In addition, they are volatile at the reaction temperatures.

It is, therefore, a principal object of the invention to provide a process for the preparation of calcium cyanamide from calcium oxide and urea in which more than a third of the urea nitrogen is converted to cyanamide nitrogen.

Other objects and advantages will be apparent from a consideration of the specification and claims.

In accordance with the invention, calcium cyanamide is prepared from the calcium component and the urea component at temperatures above 400° C. with removal of the water of reaction by carrying out the reaction in the presence of a substance which reacts with said water of reaction.

It is of advantage to use substances which react with the water of reaction relatively fast to products which do not, or only to a very small extent, enter into successive reaction with the starting, intermediary, or end product of the reaction. Suitable compounds are carbon monoxide, carbon, and hydrocarbons. With carbon monoxide, carbon dioxide and hydrogen are formed; carbon and hydrocarbons form carbon monoxide and hydrogen, whereby the carbon monoxide itself can also react with the water.

The process of the invention may be represented by the following equations:

$$2H_2N-CO-NH_3 = 2HOCN + 2NH_3 \quad (1)$$

$$CaO + 2HOCN = Ca(OCN)_2 + H_2O \quad (2)$$

$$Ca(OCN)_2 = CaCN_2 + CO_2 \quad (4)$$

$$H_2O + CO = CO_2 + H_2 \quad (6a) \text{ or}$$

$$H_2O + C = CO + H_2 \quad (6b) \text{ or}$$

$$H_2O + CH_4 = CO + 3H_2 \quad (6c)$$

which furnish the overall equation $$CaO + 2H_2N-CO-NH_2 + CO = CaCN_2 + 2NH_3 + 2CO_2 + H_2$$

$$(C) \qquad\qquad (CO_2 + CO + H_2)$$

$$(CH_4) \qquad\qquad (CO_2 + CO + 3H_2)$$

$$(7)$$

In Equation 6c, other hydrocarbons having a higher C content than methane can be used, such as ethane, propane, butane, ethylene, propylene, light benzine, benzene, heavy oil, tar, and others.

The process of the invention makes it possible to obtain nitrogen yields of 50 percent, calculated on urea nitrogen. By means of appropriate steps, which will be explained below, the nitrogen yield can be further increased. When as urea component a starting material is used which does not split off ammonia in the course of the reaction such as e.g. cyanic acid or cyanuric acid, a nitrogen yield of almost 100% can be attained.

The hydrocarbons and/or the carbon monoxide are passed through or above the reaction mixture, or they can be admixed directly to the gaseous thermal decomposition products of urea. Carbon can be introduced in the reaction mixture by admixing it in a suitable form (e.g. coal, coke, petrol coke, carbon black, active carbon, etc.) and grain size to the lime. However, it is also possible to precipitate it directly on the lime by incomplete combustion of gaseous or liquid hydrocarbons, e.g., at a preceding calcination of the limestone.

A simultaneous application of an inert gas, in addition to hydrocarbons, carbon monoxide or carbon, may be of advantage in cases where, for operative reasons, larger amounts of gases are desirable, e.g., in fluidized bed operation or for supplying or removing heat. Such addition of inert gas is, however, not necessary.

The amount of hydrocarbon, carbon monoxide, or carbon to be added is so adjusted as to take up the water formed in the reaction. It is however, of advantage to use a certain excess; for example, at least 1 mole of carbon monoxide or 1 mole of carbon (free or in form of a hydrocarbon) should be employed per mole of urea. Stating the relationship in more general terms, the mole ratio of carbon monoxide or carbon to the calcium cyanamide being formed should be at least 2:1.

The reaction of lime with urea in the presence of hydrocarbons or carbon monoxide presents, in addition to preventing the hydrolysis of cyanic acid or other intermediate products, the following advantage: If as urea component, a starting material is employed which contains ammonia or produces ammonia during the reaction, such as urea itself, biuret, triuret, ammonium cyanate, or a mixture of cyanic acid and ammonia, said ammonia can be converted in the presence of carbon monoxide, at least partially, also to calcium cyanamide, in accordance with the reaction $$CaO + 3CO + 2NH_3 = CaCN_2 + 2CO_2 + 3H_2 \quad (8)$$

Together with the formation of calcium cyanamide from cyanic acid according to Equation 7, the following summary equation applies to the reaction of calcium oxide and urea $$CaO + H_2N-CO-NH_2 + 2CO = CaCN_2 + 2CO_2 + 2H_2 \quad (9)$$

This means that the process of the invention makes it theoretically possible to obtain a 100% yield, calculated on urea nitrogen.

In this respect, it makes no difference whether the carbon monoxide is admixed as such or whether it originates from the reaction of the water of reaction with hydrocarbons or carbon. Of course, an excess of CO favors the reaction of Equation 8. Therefore, in order to utilize the ammonia nitrogen as far as possible, it is of advantage to employ an excess of carbon monoxide as a water removing agent beyond the minimum amount referred to hereinabove; if carbon or hydrocarbons are used, it is for the reasons just discussed of advantage to employ, in addition, carbon monoxide whenever a urea component is used which splits off ammonia. In the case of urea components which do not generate ammonia, such as cyanic acid, cyanuric acid, ammelide, etc., the addition of hydrocarbons or carbon alone as water removing agent is sufficient.

If for operational reasons (turbulence layers and the like) relatively large amounts of gas are required and for this reason, inert gas being undesirable, carbon oxide is used in amounts exceeding the amount specified hereinabove, such excess carbon monoxide can be utilized for the formation of calcium cyanamide by admixture of additional ammonia, e.g., of ammonia recovered from the waste gases.

The grain size of the lime affects the reaction only insofar as it influences the diffusion of the other reactants. Preferably, said size should not exceed 40 mm. However, if the process is carried out in a turbulence layer, said grain size is rather important as will be explained hereinbelow.

Generally, calcium oxide will be used which has been obtained by burning limestone. It is well known that the firing temperature has a bearing on the reactivity of the produced lime; overburnt or dead burnt lime is unsuitable for the process of the invention.

As in all processes for the nitrogenation of lime, the rate of reaction and the N-yield for a given reaction time can be increased by a certain calcium chloride content of the lime. Thereby, it is more advantageous to treat the lime, before it is subjected to the nitrogenation, to a treatment with gaseous hydrogen halide instead of simply admixing calcium halide to the lime. The halogen halide treatment may be carried out in the lime kiln immediately after the burning, but any other kind of treatment can also be applied. For the process of the invention, a treatment with gaseous hydrogen chloride or fluoride has been found to be of particular advantage whereby the calcium halide content should be at most 7% of $CaCl_2$ or 5% of $CaF_2$, calculated on $CaO + CaCl_2$ or $CaO + CaF_2$. Higher proportions of calcium halide do not increase the rate of reaction; they may even reduce it by increasing coalescence of the material.

The reaction temperature must be high enough to avoid the formation of calcium cyanate or cyanurate and to ensure that only calcium cyanamide is formed. Therefore, the minimum reaction temperature is 400° C. The preferred temperature range is between 500 and 900° C.

Depending on the temperature and on the urea component employed, the reaction may be endothermic or exothermic. The required temperature control is best carried out by means of the reaction gases and/or admixed inert gas.

Generally, the process will be carried out at the pressure presented by the pressure of the ambient atmosphere plus the flow resistance of the apparatus. However, slightly elevated pressure up to 10 atmospheres over atmospheric pressure can be applied.

The process may be operated in any apparatus which is suitable for the reaction of solids with each other or of solids with molten solids or gases, whereby also in the first two cases provision for the passage of gases must be made.

In a batch process, for instance, the solid starting materials may be intimately mixed and heated at reaction temperature in some type of retort, whereby carbon monoxide may be passed through or over the reaction mass. The mixture of the solid starting materials may also be charged continuously into a rotary kiln, which may be externally heated, or into a heatable vessel equipped with mixing and convey or screw means; the calcium cyanamide containing end product is then also continuously discharged, and gases may be passed through the apparatus in the same direction as, or countercurrently to, the solids.

In a preferred embodiment of the invention, the gaseous or vaporized urea component, if desired together with carbon monoxide, is passed through a stationary lime layer maintained at reaction temperature; the lime may contain, or be mixed with, carbon. After the product has reached the desired calcium cyanamide content, the reactor is discharged and filled with fresh lime, whereupon the nitrogenation process is started again.

This procedure may also be carried out in a continuous or semi-continuous manner; in this case, a lime layer, which is at reaction temperature and may contain carbon, travels as a moving bed downwardly through the reactor, whereby fresh lime is continuously or periodically charged at the upper end of the reactor and the calcium cyanamide containing end product is continuously or periodically discharged from the lower end of the reactor. The gaseous or vaporized urea component, to which other gases may be admixed, will be charged at the upper or lower end of the reactor, while the waste gases are discharged from the opposite end. In this way, the two reactants may be passed in the same direction or in countercurrent to each other. Generally, countercurrent operation is preferred.

In some cases, it may be of advantage to arrange two or more reactors in series whereby only the gases or the solids, or the gases and solids (in the same direction or in countercurrent), pass all the reactors one after the other. This applies to batch and continuous operation.

The process of the invention may also be carried out in a turbulence layer. In such operation, the lime, which may be diluted already with the reaction product and may, if desired, contain carbon, is brought to turbulence at reaction temperature by means of carbon monoxide, and/or hydrocarbons, and/or ammonia, and/or inert gas. However, also all or part of the recycled waste gases, or gaseous thermal decomposition products of the urea itself may serve as turbulence gas. Into the thus produced turbulent lime layer, there is introduced the urea component in a manner suited to its physical state. Solid starting material is best pneumatically injected into the turbulence layer in finely divided form by means of one or more of the turbulence producing gases through one or more nozzles; liquid starting material (melts) is blown into the turbulence layer with or without addition of gas; a gaseous or previously gasified urea component is preferably admixed to the turbulence producing gas before it enters the turbulence layer, unless said gaseous component does not serve itself as such gas.

With respect to the solid reactants, the turbulence reactor can be operated discontinuously but also continuously. In the first case, a solid charge is reacted with the urea component until the desired calcium cyanamide content is obtained, and then discharged all at once. However, it is of particular advantage to operate with a turbulence layer to the uppermost zone of which fresh lime is continuously fed and from which reaction product is continuously removed. In this way, the fresh lime is always diluted with reaction product; this prevents efficiently caking of the solids which otherwise may take place when the bed consists at the beginning of gas impinged fresh lime only.

Depending on the type of urea component, a better utilization thereof may be obtained when several turbulence reactors are connected in series, at least as far as the gas path is concerned; thereby the waste gas of the first reactor serves as turbulence producing gas of the second reactor, and so on. Generally, the urea component is introduced only into the reactor which is the first one in the direction of the gas flow; however, it can also be distributed to several of the turbulence reactors.

Under certain circumstances, series connection of the turbulence reactors may be useful also with respect to the movement of the solids. Dependent on the nature of the urea component, gas and solids will be passed through said reactors in the same direction or in countercurrent to each other. Normally, the series-connected turbulence reactors will be operated at the same temperature; however, the temperatures may also differ to produce special effects.

When the process is carried out in a turbulent layer, it is of particular advantage to employ the lime component in finely ground form with a particle size below 0.25 mm., preferably below 0.05 mm. Said particle sizes represent only maximum values. Below said values, grain size as well as grain size distribution are of no importance. Larger sizes up to amuonts of 10 to 20 percent are not harmful, provided their size does not exceed 0.5 to 0.6 mm. Theoretically, there is no lower limit; practically said limit is determined by the available grinding equipment and the economically allowable cost and is, at present, probably at about $0.1\mu$.

Considering the grain size of the lime component, the continuous type process according to the invention has the following advantages over the other modifications.

(a) When using calcium oxide and urea as starting materials, with addition of carbon oxide, the N yield in a single turbulence layer is increased up to 70 percent of theory, while the N-content of the reaction product is also increased (32 to 35% total N).

(b) The lime component need not be screened to a predetermined particle size within a rather narrow size range, and after suitable grinding, the entire raw lime can be used.

(c) Due to the inherently produced granulation in the turbulence layer, the reaction product is obtained as prills which do not require any further processing for use as fertilizer.

A coarser particle size which exceeds the maximum values recited above slows the reaction and thus reduces the nitrogen yield and/or the nitrogen content of the end product.

The grain size of the reaction product taken from the turbulence layer is above 0.1 mm.; the upper limit is a function of the turbulence bed construction. Generally, sizes of 0.8 to 1.0 mm. are not exceeded; therefore, there is no risk that the turbulence layer breaks down due to progressive growth of the grains of the product. Part of the reaction product is carried away by the turbulence producing gas as dust and can be precipitated in cyclone separators. It contains less nitrogen than the material obtained in granular form; therefore, it is preferably admixed again to the fresh charge and reintroduced into the turbulence layer. The amount of end product obtained as dust depends on the particle size of the lime component; decreasing particle size results in increased dust production.

The reaction can be carried out also in a cloud of flying dust if an empty reaction tube is used instead of the turbulence layer. Due to the necessarily low residence time of the lime component, which can be prolonged only by expensive increase of the reaction space, the yield is low, and the product is obtained essentially in the undesirable form of dust.

Generally, and for economic reasons, the process will not be pushed to a complete conversion of the calcium oxide. In this case, the reaction product, if produced at temperature above 650° C., will still contain calcium oxide. This may be undesirable because the calcium oxide is subject to hydration on storage of the product. In such a case, the calcium oxide can be made harmless in simple manner by contacting the reaction product obtained at temperatures above 650° C. finally once more with the waste gases at a temperature below 650° C. Thereby, the carbon dioxide contained in the waste gases converts the calcium oxide to indifferent calcium carbonate.

The waste gases, which consist essentially of CO, $CO_2$, $NH_3$, HCN, $N_2$ and $H_2$, can, after utilization of their heat content, be processed in various ways, depending on their exact composition, and thereby still usefully employed. For instance, ammonia can be converted to ammonium salts, whereupon the carbon monoxide of the residual gas is converted to carbon dioxide which is washed out and leaves a nitrogen-hydrogen mixture suitable for the ammonia synthesis. The thus produced ammonia may then be processed to urea which forms finally again a starting material for the process of the invention.

The following examples are given to illustrate but not to limit the invention. All percentage figures are given by weight.

EXAMPLE 1

The reaction tube was a vertical quartz tube of 40 mm. inner diameter, which was heated by two separate adjoining electrical heating coils. The lower heating zone had a length of 37 cm., the upper zone was 34 cm. long. In the range of the lower heating zone, there was supported on a ceramic perforated plate, a stationary layer of 100 g. lime which had been burnt at a temperature of 850 to 900° C. and had a grain size of 0.5 to 2.0 mm. In the range of the upper heating zone, there was arranged, also supported by a ceramic perforated plate, a 10 cm. high layer of quartz shards of a size of 5 to 10 mm. It served to vaporize cyanuric acid, charged at the upper end by means of a metering screw, to cyanic acid. In addition, the upper end of the reaction tube was equipped with inlet means for carbon monoxide. The waste gases were discharged from the lower end of the reaction tube. Carbon monoxide was passed through the filled reaction tube, and the vaporizing zone was heated at a tempearture of 500° C., the lime layer at a temperature of 650–750° C. While passing 50 Nl./h. of carbon monoxide through the apparatus and maintaining said temperature, 37.5 g. of anhydrous cyanuric acid were charged at a constant within 60 minutes. After the charging was terminated, the reaction product was cooled in a current of carbon monoxide and discharged. There were obtained 140.5 g. of a substantially white product containing 6.5 percent of N, 6.3 percent of calcium cyanamide, 18.4 percent of $CO_2$ and 33.4 percent of free CaO. The total N amount of the product corresponded to a N yield of 74.7 percent, calculated on cyanuric acid nitrogen.

EXAMPLE 2

The test described in Example 1 was repeated but instead of carbon monoxide, a mixture of 20 Nl./h. or propane gas and 30 Ni./h. of nitrogen was passed through the reactor during the reaction. Heating and cooling was carried out in a current of nitrogen. Under otherwise unchanged conditions, there were obtained 127 g. of a product containing 6.6 percent of total N, 6.2 percent of cyanamide N, and 11.5 percent of $CO_2$. The amount of nitrogen found in the product corresponded to 68.9 percent of the cyanuric acid nitrogen (nitrogen yield).

In additional tests, the propane gas was replaced by the equivalent amount, calculated on carbon, of other hydrocarbons, e.g. ethylene and gasoline (the latter was introduced in liquid form into the cyanuric acid vaporization zone). It was found that always approximately the above recited nitrogen yields were obtained, independently of the type of hydrocarbon used and the presence of an inert gas.

EXAMPLE 3

Example 1 was essentially repeated, only lime containing 21% of carbon was used, whereby the amount of CaO was the same. The carbon had been precipitated on the lime by incomplete combustion of propane gas during the burning of the lime. Further, the same liter amount of nitrogen was pased through the reactor, instead of carbon monoxide. Under otherwise the same conditions as in Example 1, there were obtained 126 g. of a product containing 6.8% of total N, 6.3% of cyanamide N, and 10.3% of $CO_2$. The total N content of the product corresponded to a nitrogen yield of 69.8%, calculated on the cyanuric acid N.

EXAMPLE 4 (Comparison)

Example 1 was repeated but the carbon monoxide was replaced by the same liter amount of nitrogen. Under otherwise the same conditions, there were obtained 122.4 g. of a product containing 5.8% of total N, 5.6% of cyanamide N, and 17.5% of $CO_2$. Therefore, the yield of total N, calculated on cyanuric acid N, was only 58.1 percent.

EXAMPLE 5

Example 1 was repeated with lime samples having various contents of $CaCl_2$. Said $CaCl_2$ was produced on or in the calcium oxide by treating it with hydrogen chloride gas. In the following table, the total N yields, calculated on cyanuric acid N, are given as a function of the calcium chloride content of the calcium oxide, calculated on $CaO+CaCl_2$.

| Test No. | Percent CaCl₂ calculated on CaO+Cl₂ | N yield calculated on cyanuric acid N |
|---|---|---|
| 0 | 0.0 | 74.7 |
| 1 | 1.10 | 78.4 |
| 2 | 1.83 | 79.3 |
| 3 | 3.90 | 80.0 |
| 4 | 5.85 | 80.8 |
| 5 | 7.2 | 80.5 |
| 6 | 8.20 | 76.3 |

As the table shows, the N yield first increases for the reaction times with increasing $CaCl_2$ content of the lime; above 4% $CaCl_2$, the further increase is very small, and the yield decreases at $CaCl_2$ contents above 7%.

EXAMPLE 6

28 g. of lime which had been burnt at 850–900° C. and then ground, were thoroughly mixed with 12.5 g. of ammeline. Said mixture was placed in a narrow porcelain crucible, equipped with a gas inlet tube which extended to the bottom of the crucible and through which 15 Nl./h. of carbon monoxide were introduced during the reaction. The crucible was heated in an externally electrically heated reaction tube for 3 hours at 850° C. 50 Nl./h. of carbon monoxide were passed through the reaction tube to prevent the entry of air. After the reaction was terminated, the crucible was cooled in a CO atmosphere and then removed from the tube. The crucible content was weighed and analyzed. There were obtained 33.3 g. of a product containing 18.6% of total N, 18.2% of cyanamide N, and 0.0% of $CO_2$. This corresponded to an N yield of 90%, calculated on the ameline N.

EXAMPLE 7

The apparatus used consisted of a turbulent bed vaporizer for urea and a shaft oven equipped at its upper end with charging means for burnt lime and a gas exhaust and at its lower end with discharge and storage means for the reaction product and with means for introduction of the reaction gas. At the start of the test, the shaft oven was filled with burnt lime which had a grain size of 3–4 mm. and contained 2.5% $CaF_2$, calculated on $CaO+CaF_2$, which had been produced by treatment with hydrogen fluoride.

In the fluidized bed gasifier, quartz sand was put into turbulent motion by means of 140 parts/hour of CO, and 120 parts/hour of molten urea were injected through a nozzle into the fluidized bed which had a temperature of 420° C. The CO—$NH_3$—HOCN mixture leaving the gasifier was introduced into the bottom of the shaft furnace and passed upwardly through the lime charge which was maintained at a temperautre of 750 to 800° C. After a starting period of 2 hours, 94 parts/hour of lime were charged continuously into the shaft oven and the same hourly volume of reaction product was continuously discharged from the bottom of the furnace, so as to maintain a constant level of the charge therein. In this way, there were obtained for 24 hours an average output of 129.3 parts/hour of a reaction product which contained 25.1% of N and 5.6% of $CO_2$, corresponding to an N yield of 58%, calculated on urea N.

In another 24 hours test the reaction product discharged from the shaft oven was treated in a second similar shaft oven at 500° C. with the waste gases of the first oven so as to convert the calcium oxide to calcium carbonate. In this way, there was obtained a reaction product containing 22.8% of total N and 14.2% of $CO_2$, corresponding to a residual CaO content of 2.5%, compared with 15.5% in the first test.

EXAMPLE 8

A fluidized bed reactor having an inner diameter of 40 mm. was electrically heated from the outside and filled with 300 g. of CaO; said CaO had a grain size of 0.3 to 0.5 mm. and had been obtained by burning $CaCO_3$ at a temperature of 850 to 900° C. and contained 4.1% of $CaCl_2$, produced by treatment with gaseous HCl. The CaO charge was fluidized by means of 220 Nl./h. of carbon monoxide at a temperature of 800° C. Through a nozzle laterally projecting into the bed, 475 g. of dry crystalline urea were injected by means of 110 Nl./h. of nitrogen. After the addition of urea was terminated, the charge was cooled in a current of nitrogen, and then the reaction product was discharged. The reaction product was 403 g. of a product containing 30.5% of total N (29.9% of cyanamide N) and 0.2% of $CO_2$. The nitrogen amount taken up by the calcium oxide corresponded to an N-yield of 55.5%, calculated on urea N.

EXAMPLE 9

Example 8 was repeated with the following modification: The urea was vaporized in a fluidized bed gasifier as described in Example 7 whereby 220 Nl./h. of carbon monoxide were used to fluidize the bed and the carbon monoxide-ammonia-cyanic acid effluent was passed into the fluidized bed reactor as turbulence producing and reacting gas. Therefore, the nitrogen used in Example 8 for injection of the urea was omitted. Under otherwise similar conditions, there were obtained 411 g. of a product which had a total N content of 29.3% (28.7% cyanamide-N) and a $CO_2$ content of 0.8%. Therefore, the N-yield was 54.3%.

EXAMPLE 10

The apparatus was a fluidized bed reactor having an inner diameter of 100 mm.; the reactor was electrically heated from the outside. At its upper end, the reactor was equipped with a lime hopper which could be closed against the reactor, and with a feed screw, and also with an outlet for the waste gas. Downwardly through the fluidized bed support (20 mm. projecting therefrom), there was arranged a vertical tube of 10 mm. inner diameter leading to a discharge screw for the reaction product which passed said product to a closed storage bin. The inlet for the turbulence producing gas was below said support. 50 mm. above said support, a horizontal nozzle projected laterally into the reactor for injecting the molten urea into the fluidized bed; the melt was fed to said nozzle from a storage vessel by means of a metering pump. The bed in the quiescent state had a height of 30 cm. At the beginning of the test, the reactor was filled to said level with burnt lime which had been calcined at 900° C., had a grain size of 0.3 to 0.5 mm. and a calcium chloride content of 3%, produced by treatment with HCl gas. Said charge was then put into turbulent motion by means of 2500 Nl./h. of carbon monoxide and heated to the reaction temperature of 800° C. 700 g./hour of molten urea were injected at said temperature into the fluidized bed. After about 2.5 hours, the lime had a nitrogen content of about 22%. At that point, continuous operation was started. For this purpose, 750 g./hour of the same lime as used for the initial charge was fed from above into the fluidized bed, and an hourly volume of end product corresponding to the lime charge was discharged so as to maintain the filling height in the reactor constant. Said continuous operation was maintained for 24 hours. As an average, 934 g./h. of reaction product were obtained; it contained 22.5% of total N (22.0% of calcium cyanamide N) and 0.0% of $CO_2$. The total N found in the reaction product corresponded to 62.5% of the urea N.

The pressure in the reactor was 1.3 atm. When it was raised to 3 atm., the nitrogen yield was 63% for the same rate by volume of the turbulence producing gas.

EXAMPLE 11

Example 10 was repeated with the modification that the carbon monoxide (2500 Nl./h.) was mixed, prior to its admission to the reactor, with 475 Nl./h. of ammonia and that the lime feed was increased to 1340 g./h. In a 16 hour test under these conditions, there were obtained, as an average, 1680 g./h. of a reaction product containing 22.9% of total N (22.6% of cyanamide N) and 0.5% of $CO_2$. Therefore, the N yield was 52.9%, calculated on the nitrogen introduced as urea and ammonia.

EXAMPLE 12

Example 10 was repeated but the lime was replaced by calcium carbonate of the same grain size and calcium chloride content (calculated on $CaO+CaCl_2$). Under otherwise similar conditions, a 16 hour test produced as average 940 g./h. of a reaction product containing 21.6% of total N (21.1% of cyanamide N) and 1.1% of $CO_2$. This corresponded to a nitrogen yield of 60.3%.

EXAMPLE 13

Example 10 was repeated with the modification that half of the hourly amount of carbon monoxide was replaced by waste gas which was recycled by means of a hot gas blower. Under otherwise unchanged conditions, the test was carried out for 16 hours and produced, as an average, per hour 950 g. of a reaction product containing 21.8% of total N (21.4% of cyanamide N) and 1.0% of $CO_2$. This corresponded to a nitrogen yield of 61.6%, calculated on urea nitrogen.

EXAMPLE 14

The apparatus of Example 10 was supplemented by a second turbulence reactor which was arranged above the first reactor and had the same dimensions. The lime charging means were placed on the second reactor; in addition, said second reactor was equipped with discharge means like the first reactor (without collecting bin) which made it possible to convey the solid material continuously from the second (upper) reactor into the first (lower) reactor. The gas outlet of the lower reactor was connected to the gas inlet of the upper reactor so as to utilize the waste gas of the lower reactor as turbulence producing and reacting gas in the upper reactor. The lime was fed into the upper reactor and was contacted with the reaction gas first in said upper and then in the lower reactor. Before the test started, both reactors were filled with the amount of lime indicated in Example 10. Both reactors were operated at 800° C.

Under otherwise the same conditions as set forth in Example 10, a 24 hour test produced as hourly average 948 g. of a reaction product containing 23.5% of total N (22.8% of cyanamide N) and 0.0% of $CO_2$. Therefore, 66.2% of the nitrogen introduced as urea were found in the reaction product.

EXAMPLE 15

The apparatus was a turbulence reactor. It consisted of an externally heated vertical quartz tube having an inner diameter of 40 mm. and a length of 1200 mm. The support for the turbulence bed was arranged 200 mm. above the lower end of the reactor. 50 mm. above its bottom, the quartz tube was equipped with two lateral opposite inlets, one for receiving the urea injection nozzle, the other for the lime injection nozzle. Each of said nozzles was connected with a metering screw and a storage vessel. CO gas was introduced between the metering screws and nozzles to inject the solid material (lime or urea). An overflow discharge pipe for the reaction product was disposed axially in the reaction tube; the discharge pipe passed through the bottom and the lower closure of the reactor into a product bin closed against the atmosphere. The temperature of the fluidized bed was controlled by means of a thermoelement which extended from above to about 50 mm. above the bottom of the reactor. The upper end of the reaction tube was equipped with a gas outlet which connected to two series-connected cyclones for separation of the entrained product.

The lime used as starting material had been ground, after burning, in a pinned disc mill to a grain size of about 1 to 40$\mu$. To improve its reactivity, it had been treated with HCl gas to a $CaCl_2$ content of 2 percent.

The urea used as a technically pure product of commerce in crystalline form of the conventional grain size. At the start of the test, 200 g. of calcium cyanamide of a preceding test containing a N content of 31.9% and having a grain size of about 0.1 to 0.5 mm. were placed into the reactor. By means of 70 Nl./h. of carbon monoxide introduced from below said starting charge was fluidized and externally heated to 800° C.

At said temperature, continuously 36 g./h. of CaO and 51 g./h. of urea, each by means of 65 Nl./h. of CO, were injected into the fluidized calcium cyanamide bed. The obtained granulated product was automatically conveyed by means of the overflow pipe into the collecting bin; the material entrained as dust was separated in the cyclones, again mixed with fresh lime, and injected again with said lime into the fluidized bed.

After a reaction time of 8 hours, the following nitrogen balance was obtained:

|  | Content | | | | |
|---|---|---|---|---|---|
|  | Amount g. | Total N, percent | Cyanamide N, percent | $CO_2$ percent | Total N, g. |
| (1) Calcium cyanamide overflow, grain size about 0.1 to 0.5 mm. | 367 | 33.0 | 32.6 | 0.2 | 121.0 |
| (2) Calcium cyanamide removed from reactor after termination of test, grain size about 0.1 to 0.5 mm. | 215 | 32.6 | 32.3 | 0.2 | 70.2 |
| (3) Product from cyclone | 25 | 11.3 | 10.1 | 2.0 | 2.8 |
| (4) Sum | | | | | 194.0 |
| (5) Initial charge deducted | 200 | 31.9 | | | 63.8 |
| (6) Amount of produced nitrogen | | | | | 130.2 |
| (7) Amount of nitrogen introduced (urea) | 408 | 46.3 | | | 188.8 |
| (8) Yield (total N produced calculated on nitrogen introduced as urea) | | 69.0 | | | |

The overflow of the product from the fluidized bed operated smoothly, and also after cooling in the collecting bin the material was free-flowing.

EXAMPLE 16

Example 15 was repeated but burnt hydrated lime from the calcium carbide gasification was used as starting material. Grain size and calcium chloride content were adjusted as in Example 15. The hourly lime feed was 40 g.

Under otherwise the same reaction conditions as in Example 15, the following nitrogen balance was obtained:

|  | Content | | | | |
|---|---|---|---|---|---|
|  | Amount g. | Total N, percent | Cyanamide N, percent | $CO_2$ percent | Total N, g. |
| (1) Calcium cyanamide overflow, grain size about 0.1 to 0.5 mm. | 391 | 29.2 | 29.0 | 0.3 | 114.2 |
| (2) Calcium cyanamide removed from reactor after termination of test, grain size about 0.1 to 0.5 mm. | 210 | 30.7 | 29.4 | 0.3 | 64.5 |
| (3) Product from cyclone | 29 | 13.0 | 11.9 | 2.5 | 3.8 |
| (4) Sum | | | | | 182.5 |
| (5) Initail charge deducted | 200 | 31.9 | | | 63.8 |
| (6) Amount of produced nitrogen | | | | | 118.7 |
| (7) Amount of nitrogen introduced (urea) | | | | | 188.8 |
| (8) Yield (Total N produced calculated on nitrogen introduced as urea) | | 62.9 | | | |

The product obtained was also free-flowing.

EXAMPLE 17

In this test, the reaction was carried out in the flying dust cloud. The apparatus was that used in Example 15 where the fluidized layer of granulated calcium cyanamide was replaced by a layer of quartz sand having a grain size of 0.1 to 0.3 mm. and in quiescent state a height of 50 mm. The purpose of said fluidized layer of quartz sand was to vaporize the injected urea to ammonia and cyanic acid and to raise the temperature of the injected lime to the reaction temperature of 800° C.

The starting material was a lime as described in Example 15 of the same grain size and the same calcium chloride content. The feed per hour was 50 g. of urea and 47 g. of lime. A total of 200 Nl./h. of carbon monoxide was passed through the apparatus, in the same distribution as set forth in Example 15.

After a reaction time of 1 hour, there had been collected in the two cyclones 65.9 g. of a product containing 15.8% of total N, 13.5% of cyanamide N and 5.5% of $CO_2$. This corresponded to a yield of 45.0% if the total nitrogen of the product was calculated on the nitrogen introduced as urea. When the nitrogen content of the small accretions on the quartz sand was taken into account, the yield increased to 47.2%.

The product obtained in the cyclones had a grain size of about 10 to 60μ.

As shown by the examples, the process of the invention provides for a considerable increase of the nitrogen yield over the prior art methods. When using calcium oxide and urea as starting materials, with addition of carbon monoxide, 70 percent of the urea nitrogen can be converted to cyanamide nitrogen, while a duplication of the known procedures produced a nitrogen yield of only 41.6 percent. If cyanuric acid is used as starting material, the process of the invention gives a yield of 74.7 percent while the known procedures allow of converting only 58.2 percent of the cyanuric acid nitrogen into cyanamide nitrogen.

I claim:
1. A process for the preparation of calcium cyanamide comprising reacting calcium oxide and a member of the group consisting of urea and a thermal decomposition product thereof selected from the group consisting of biuret, triuret and higher linear condensation products of urea, cyanic acid, a mixture of cyanic acid and ammonia, ammonium cyanate, cyanuric acid, ammelide, ammeline, melamine and its thermic deamination products melam and melem, at a temperature above 400° C. in the presence of at least one member selected from the group consisting of carbon, carbon monoxide, carbon monoxide diluted with ammonia and hydrocarbons which reacts with water formed in the reaction.

2. The process as claimed in claim 1 wherein said calcium oxide has a grain size not exceeding 40 mm. and contains 0.1 to 7 percent of a calcium halide selected from the group consisting of calcium chloride and calcium fluoride.

3. The process as claimed in claim 1 wherein the reaction is carried out in the presence of carbon monoxide diluted with ammonia.

4. The process as claimed in claim 1 wherein the reaction is carried out at a temperature of 500 to 900° C.

5. The process as claimed in claim 1 wherein a thermal decomposition product of urea is used as a reactant and said thermal decomposition product is passed through a bed of said calcium oxide.

6. The process as claimed in claim 1 wherein at least one of the reactants is gaseous and said reactant is passed countercurrently to at least one other reactant in solid form through reactors connected in series.

7. The process as claimed in claim 1 wherein the reaction is carried out in a fluidized bed.

8. The process as claimed in claim 7 wherein said bed is fluidized by means of a member selected from the group consisting of carbon monoxide, carbon monoxide diluted with ammonia, and hydrocarbons.

9. The process as claimed in claim 7 wherein said bed is fluidized by a gas containing at least a portion of waste gas of the reaction.

10. The process as claimed in claim 7 wherein a thermal decomposition product of urea is used as a reactant and said bed is fluidized by said thermal decomposition product.

11. The process as claimed in claim 7 wherein said calcium oxide is used in a particle size below 0.25 mm.

12. The process as claimed in claim 1 comprising contacting the reaction product obtained at a temperature in excess of 650° C. with waste gases from the reaction at a temperature of at least 400 but less than 650° C.

References Cited
UNITED STATES PATENTS 3,173,755   3/1965   Picard et al. _____ 23—78

FOREIGN PATENTS 1,044,786   11/1958   Germany.

OSCAR R. VERTIZ, Primary Examiner

HOKE S. MILLER, Assistant Examiner

U.S. Cl. X.R.
23—190, 210